United States Patent
Ding (10) Patent No.: US 11,546,387 B2
(45) Date of Patent: Jan. 3, 2023

(54) NETWORK CONFERENCE MANAGEMENT METHOD AND APPARATUS AND STORAGE MEDIUM, AND NETWORK CONFERENCE PLATFORM AND SYSTEM

(71) Applicant: BOE TECHNOLOGY GROUP CO., LTD., Beijing (CN)

(72) Inventor: Shasha Ding, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 60 days.

(21) Appl. No.: 16/970,147

(22) PCT Filed: Dec. 26, 2019

(86) PCT No.: PCT/CN2019/128650
§ 371 (c)(1),
(2) Date: Aug. 14, 2020

(87) PCT Pub. No.: WO2020/140822
PCT Pub. Date: Jul. 9, 2020

(65) Prior Publication Data
US 2020/0404027 A1   Dec. 24, 2020

(30) Foreign Application Priority Data
Jan. 2, 2019   (CN) .......................... 201910002760.9

(51) Int. Cl.
*H04L 29/06* (2006.01)
*H04L 65/1069* (2022.01)
(Continued)

(52) U.S. Cl.
CPC ...... *H04L 65/1069* (2013.01); *H04L 65/1096* (2013.01); *H04L 65/403* (2013.01)

(58) Field of Classification Search
CPC ............. H04L 65/1069; H04L 65/1096; H04L 65/403; H04L 12/1818; H04L 12/1827; H04N 7/15; H04N 7/155
See application file for complete search history.

(56) References Cited

U.S. PATENT DOCUMENTS 6,573,926 B1   6/2003   Ichimura
9,749,196 B2   8/2017   Wu
(Continued)

FOREIGN PATENT DOCUMENTS

CN   1735191 A   2/2006
CN   101257395 A   9/2008
(Continued)

OTHER PUBLICATIONS

International Search Report of PCT/CN2019/128650 in Chinese, dated Mar. 17, 2020 with English Translation.
(Continued)

*Primary Examiner* — Kim T Nguyen
(74) *Attorney, Agent, or Firm* — Collard & Roe, P.C.

(57) ABSTRACT

Provided in the present disclosure are a network conference management method and apparatus and a storage medium, and a network conference platform and system, the network conference management method including: acquiring conference reservation information, the conference reservation information at least including the conference start time and the total number of participating devices; on the basis of the total number of participating devices, automatically allocating a target shared conference account and corresponding resources; and, at the conference start time, automatically accessing participating devices already logged into the target shared conference account.

18 Claims, 5 Drawing Sheets

(51) Int. Cl.
*H04L 65/1096* (2022.01)
*H04L 65/403* (2022.01)

(56) References Cited

U.S. PATENT DOCUMENTS

| | | | |
|---|---|---|---|
| 2004/0088362 A1 | 5/2004 | Curbow et al. | |
| 2007/0263825 A1 | 11/2007 | Shah et al. | |
| 2009/0232291 A1 | 9/2009 | Prabhune et al. | |
| 2012/0179742 A1* | 7/2012 | Acharya | H04N 21/23116 709/202 |
| 2015/0156457 A1 | 6/2015 | Wamorkar et al. | |
| 2016/0004981 A1* | 1/2016 | Wang | G06Q 10/1095 705/6 |
| 2016/0156570 A1* | 6/2016 | Mori | G06Q 10/1095 709/204 |
| 2020/0404027 A1 | 12/2020 | Ding | |

FOREIGN PATENT DOCUMENTS

| | | | |
|---|---|---|---|
| CN | 101588253 A | | 11/2009 |
| CN | 101895407 A | | 11/2010 |
| CN | 102893573 A | | 1/2013 |
| CN | 103593753 A | | 2/2014 |
| CN | 106534763 A | | 3/2017 |
| CN | 106851177 A | | 6/2017 |
| CN | 106993151 | * | 7/2017 |
| CN | 106993151 A | | 7/2017 |
| CN | 107480799 A | | 12/2017 |
| CN | 108055334 A | | 5/2018 |
| CN | 108933673 | * | 12/2018 |
| CN | 108933673 A | | 12/2018 |
| CN | 108989741 A | | 12/2018 |
| CN | 109547733 A | | 3/2019 |
| EP | 2 712 180 B1 | | 11/2015 |
| JP | 2009239714 | * | 10/2009 |

OTHER PUBLICATIONS

Written Opinion of the International Searching Authority of PCT/CN2019/128650 in Chinese, dated Mar. 17, 2020.
First Chinese Office Action in Chinese Application No. 201910002760.9, dated Jan. 13, 2020 with English translation.
Second Chinese Office Action in Chinese Application No. 201910002760.9, dated Aug. 24, 2020 with English translation.
Extended European Search Report in European Application No. 19907535.9 dated Sep. 27, 2022.

* cited by examiner

NETWORK CONFERENCE MANAGEMENT METHOD AND APPARATUS AND STORAGE MEDIUM, AND NETWORK CONFERENCE PLATFORM AND SYSTEM

CROSS REFERENCE TO RELATED APPLICATIONS

This application is the National Stage of PCT/CN2019/128650 filed on Dec. 26, 2019, which claims priority under 35 U.S.C. § 119 of Chinese Application No. 201910002760.9 filed on Jan. 2, 2019 the disclosure of which is incorporated by reference.

TECHNICAL FIELD

The present disclosure relates to the technical field of communication, in particular to a network conference management method and an apparatus.

BACKGROUND

In enterprises, in order to facilitate the communication between employees at different office locations, network conferences have gradually become a preferred manner of communication. At present, some enterprises rent a third-party network conference platform so as to conduct a multi-party network conference, but many conferences, especially internal conferences, often involve trade secrets. Therefore, in order to ensure the data security of network conferences, it is necessary to deploy network conference platforms inside enterprises so as to implement network conference management inside the enterprises.

In the related art, network conferences can be reserved, established, conducted, etc. through network conference platforms deployed inside enterprises, and enterprises can allocate a conference account for each employee and allocate conference resources for each conference account through the network conference platforms.

SUMMARY

According to a first aspect of the present disclosure, a network conference management method is provided. The method includes acquiring conference reservation information, which at least comprises a conference start time and a total number of participating devices; allocating automatically a target shared conference account and a corresponding resource, according to the total number of the participating devices; and accessing automatically a participating device which has logged in the target shared conference account, at the conference start time.

Optionally, the method further comprises: invoking a resource that is corresponding to the target shared conference account so as to conduct the network conference, and releasing the target shared conference account and the corresponding resource when the network conference ends.

Optionally, the conference reservation information further comprises at least one target conference room information; and in prior to accessing automatically the participating device which has logged in the target shared conference account at the conference start time, the method further comprises determining participating device information that is corresponding to each conference room information, according to a corresponding relationship between preset conference room information and participating device information. Accessing automatically the participating device which has logged in the target shared conference account at the conference start time, further comprises: booting automatically respective participating devices, according to respective participating device information; and accessing automatically the respective participating devices. The participating device information comprises an IP address of a participating device.

Optionally, allocating the target shared conference account according to the total number of the participating devices, comprises: determining a maximum concurrent number of participating devices that are corresponding to respective shared conference accounts which are remained, from a preset shared conference account resource pool; and selecting, from the respective shared conference accounts, a target shared conference account which has a maximum concurrent number greater than or equal to the total number of the participating devices for allocation.

Optionally, acquiring the conference reservation information comprises receiving main conference room reservation information, which at least comprises a conference start time and a first number of main conference room participating devices; receiving a contact account of a branch conference room, when receiving an establish instruction of the branch conference room; transmitting a request for filling branch conference room reservation information to the contact account of the branch conference room; receiving branch conference room reservation information that is associated with the contact account of the branch conference room, which at least comprises a second number of branch conference room participating devices; and adding the first number and the second number so as to obtain the total number of the participating devices.

Optionally, the main conference room reservation information further comprises at least one of a conference topic, a conference end time, a main conference room location, and main conference room participant information, and the branch conference room reservation information further comprises at least one of a branch conference room location and branch conference room participant information.

According to a second aspect of the present disclosure, a network conference management apparatus is provided. The apparatus comprises an acquisition module, an allocation module, and a first access module. The acquisition module is configured to acquire conference reservation information, which at least comprises a conference start time and a total number of participating devices. The allocation module is configured to allocate a target shared conference account, according to the total number of the participating devices. The first access module is configured to access a participating device which has logged in the target shared conference account at the conference start time.

Optionally, the network conference management apparatus further comprises an invoking module and a releasing module. The invoking module is configured to invoke a target conference resource that is corresponding to the target shared conference account so as to conduct a network conference. The releasing module is configured to release the target shared conference account and the target conference resource, when the network conference ends.

Optionally, the conference reservation information further comprises at least one target conference room information, and the apparatus further comprises: a determination module, a booting module, and a second access module. The determination module is configured to determine participating device information that is corresponding to each conference room information, according to a corresponding relationship between preset conference room information and participating device information, in prior to accessing respective participating devices by the first access module. The booting module is configured to boot the respective participating devices according to respective participating device information at the conference start time. The second access module is configured to access the respective participating devices. The participating device information comprises an IP address of a participating device.

Optionally, the allocation module comprises: a determination sub-module and an allocation sub-module. The determination sub-module is configured to determine a maximum concurrent number of participating devices that are corresponding to respective shared conference accounts which are remained, from a preset shared conference account resource pool. The allocation sub-module is configured to select, from the respective shared conference accounts, a target shared conference account which has a maximum concurrent number greater than or equal to the total number of the participating devices for allocation.

Optionally, the acquisition module comprises: a first receiving sub-module, a second receiving sub-module, a transmitting sub-module, a third receiving sub-module, and an operation sub-module. The first receiving sub-module is configured to receive main conference room reservation information, which at least comprises a conference start time and a first number of main conference room participating devices. The second receiving sub-module is configured to receive a contact account of a branch conference room, when receiving an establish instruction of the branch conference room. The transmitting sub-module is configured to transmit a request for filling in branch conference room reservation information to the contact account of the branch conference room. The third receiving sub-module is configured to receive branch conference room reservation information that is input through the contact account of the branch conference room, which at least comprises a second number of branch conference room participating devices. The operation sub-module is configured to add the first number and the second number so as to obtain the total number of the participating devices.

According to a third aspect of the present disclosure, a computer-readable storage medium is provided, which implements the network conference management method described above.

According to a fourth aspect of the present disclosure, a network conference platform is provided. The network conference platform comprises an office automation server group, a multi-party conference management server group, and a participating device access server group. The office automation server group is configured to acquire conference reservation information which at least comprises a conference start time and a total number of participating devices. The multi-party conference management server group is configured to receive the conference reservation information from the office automation server group, and allocate a target shared conference account, according to the total number of the participating devices. The participating device access server group is configured to access a participating device which has logged in the target shared conference account into the network conference platform at the conference start time.

Optionally, the multi-party conference management server group is further configured to invoke a target conference resource that is corresponding to the target shared conference account so as to conduct a network conference, and release the target shared conference account and the target conference resource when the network conference ends.

Optionally, the participating device access server group is also configured to automatically call the participating devices at the conference start time, so that a participating device which is in a power-on state automatically enters a network conference. The network conference platform further comprises: a load balancing server group and a cascade server group. The load balancing server group is configured to automatically allocate the participating devices to a hardware access server that has a lightest load. The cascade server group is configured to cascade the participating devices.

Optionally, the multi-party conference management server group comprises a master server and at least one standby server, the master server keeps real-time synchronization of data with the at least one standby server, and switches to one of the at least one standby server in a case where the master server fails.

Optionally, the master server and the standby server perform data interaction with the office automation server group through a virtual IP address.

Optionally, the participating device access server group comprises two or more access servers that simultaneously conduct online participating device access services.

According to a fifth aspect of the present disclosure, a network conference system is provided. The network conference system comprises the network conference platform described above, and further comprises one or more of a camera, a display which is used for displaying power point and other presentations or word/pdf documents, a projector, a microphone, a speaker, an earphone, and a networking device.

DETAILED DESCRIPTION

In order to make the objects, features and advantages of the present disclosure more clear, the present disclosure are further described in detail in connection with the drawings and specific implementations.

In the related art, with a network conference platform deployed within an enterprise, the enterprise can allocate a conference account for each employee, and allocates conference resources for each conference account. However, for a large enterprise, a large number of conference accounts need a mass of conference resources, and it is difficult to manage the large number of conference accounts.

The present disclosure provides a network conference management method and apparatus to solve the problem that it is difficult to manage the conference accounts due to the large number of the conference accounts. Description will be provided with reference to exemplary embodiments hereinafter.

Embodiment 1

Figure 1:
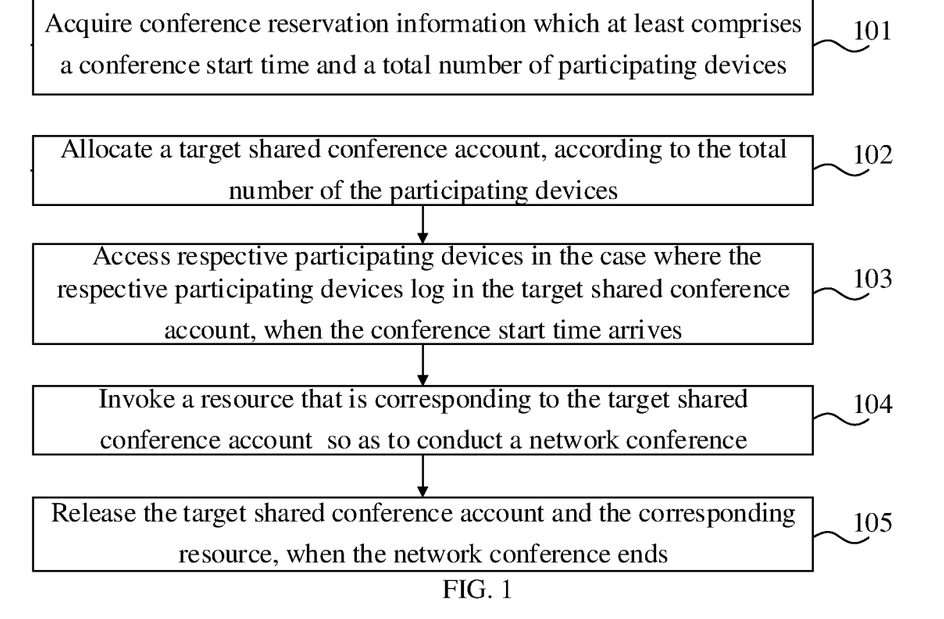
FIG. 1 illustrates a flow chart of a network conference management method according to a first embodiment of the present disclosure.

With reference to FIG. 1, a flow chart of a network conference management method according to the embodiment 1 of the present disclosure is illustrated. The method comprises the following steps.

In step 101: conference reservation information is acquired, and the conference reservation information at least comprises a conference start time and a total number of participating devices.

In the daily work within an enterprise, employees at far offices or different office territories may need to conduct network conferences, so that they can communicate on work conveniently and quickly. An enterprise can deploy a network conference platform internally, so as to implement the network conference management inside the enterprise. Employees can reserve, establish, and conduct, etc., network conferences through software devices supporting the network conference platform, such as smart phones, desktop computers, and tablet computers, etc., or hardware devices supporting the network conference platform.

In the case where it is necessary to conduct a network conference, employees can make a conference reservation through a network conference platform. In a practical application, conference reservation information can be filled in a conference reservation system, and the conference reservation information at least includes a conference start time and a total number of participating devices. The total number of the participating devices represents the total number of devices that need to log in the system to participate in the network conference. In a practical application, the place where personnel hosting the network conference or their devices are located can be used as a main conference room, and the place where other personnel participating in the network conference or their devices are located can be used as a branch conference room. For example, a department A which includes 6 participants can be used as a main conference room, a department B which includes 4 participants can be used as a branch conference room, and a department C which includes 3 participants can be used as another branch conference room. There may be people in each conference room who need to attend the conference. Accordingly, the total number of the participating devices represents a sum of devices that need to log in so as to participate in the network conference in the main conference room and each branch conference room.

In step 102: a target shared conference account is allocated according to the total number of the participating devices.

In the embodiments of the present disclosure, after obtaining the conference reservation information, according to the total number of the participating devices which participate in this network conference, the network conference platform can allocate a target shared conference account that can support such a total number of participating terminals to participate in the conference concurrently.

After the network conference platform allocates the target shared conference account for the network conference, a notice of successful conference reservation may be transmitted to each participant account. The notice may include a joining link, the target shared conference account and related information, such as a password of the target shared conference account, a usage period, and etc.

In step 103: when the conference start time arrives, respective participating devices access the platform, which have logged in the target shared conference account.

When the scheduled conference start time is about to arrive, each participant can log in the target shared conference account on their respective participating devices and trigger the joining link, so that when the conference start time arrives, the respective participating devices, which have logged in the target shared conference account into the network conference platform, can get access to the network conference platform.

In step 104: to conduct a network conference, a resource corresponding to the target shared conference account is invoked.

The actual number of conference resources allocated by the network conference platform for each shared conference account is different. In the case where the network conference platform selects a target shared conference account from respective shared conference accounts and assigns it to the network conference, the network conference platform can invoke the target shared conference resource that is corresponding to the target shared conference account so as to conduct the network conference. In a practical application, the target conference resource may include a media resource, a server resource, a codec resource and other resources needed for network conference services.

In step 105: the target shared conference account and the target conference resource are released, when the network conference ends.

After the conference is finished, a user can exit the network conference by clicking a conference exit icon. The network conference ends when all users exit the network conference or when the conference end time reserved in advance by the personnel at the main conference room arrives. The network conference platform can release the target shared conference account and the target conference resource so that the target shared conference account can be released into a shared conference account resource pool, and then the target shared conference account can be used again when other users make conference reservations. That is, each shared conference account can be allocated according to the needs of participating devices, and then recycled after the conference ends. In this way, the actual number of conference accounts that need to be managed is reduced, and thus the difficulty and cost of conference account management can be reduced accordingly. In addition, because the shared conference accounts can be allocated according to needs, it can avoid the phenomenon that only higher-level employees are allocated conference accounts in order to reduce the difficulty and cost of conference account management. In this way, every employee in an enterprise can reserve and conduct a network conference by using shared conference accounts, and thus office efficiency can be improved.

In the embodiments of the present disclosure, the network conference platform may first acquire conference reservation information which at least comprises a conference start time and a total number of participating devices; then allocate a target shared conference account according to the total number of the participating devices. Respective participating devices which have logged in the target shared conference account get access to the platform, when the conference start time arrives; and then invoke a target conference resource that is corresponding to the target shared conference account so as to conduct a network conference. Finally, when the network conference ends, the target shared conference account and the target conference resource can be released. In the embodiments of the present disclosure, the shared conference accounts can be allocated according to the needs of participating devices, and then recycled after the conference ends. In this way, the actual number of conference accounts that need to be managed is reduced, thus the difficulty of conference account management can be reduced.

Embodiment 2

Figure 2:
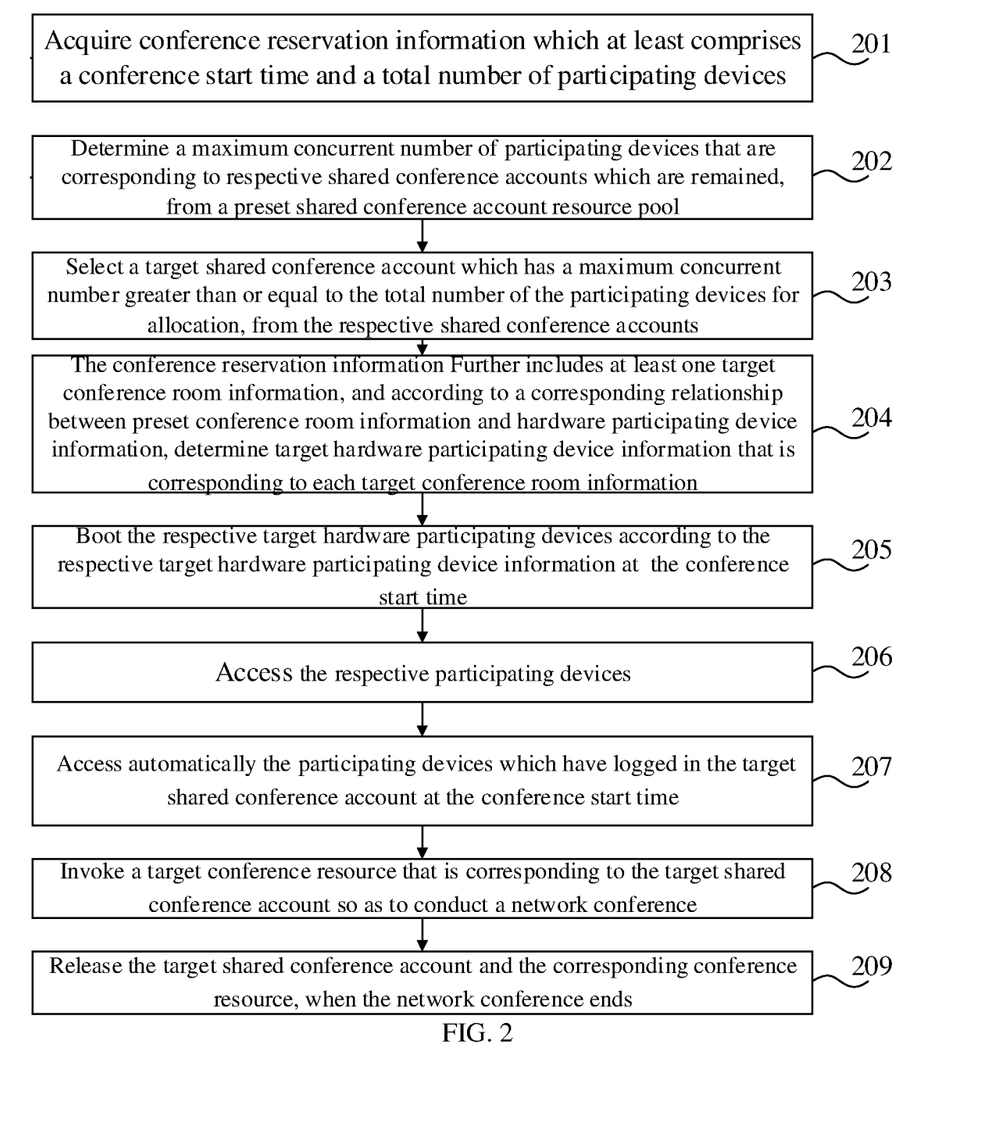
FIG. 2 illustrates a flow chart of a network conference management method according to a second embodiment of the present disclosure.

With reference to FIG. 2, a flow chart of a network conference management method according to the embodiment 2 of the present disclosure is illustrated. The method comprises the steps as follows.

In step 201: conference reservation information is acquired, and the conference reservation information at least includes a conference start time and a total number of participating devices.

Figure 3:
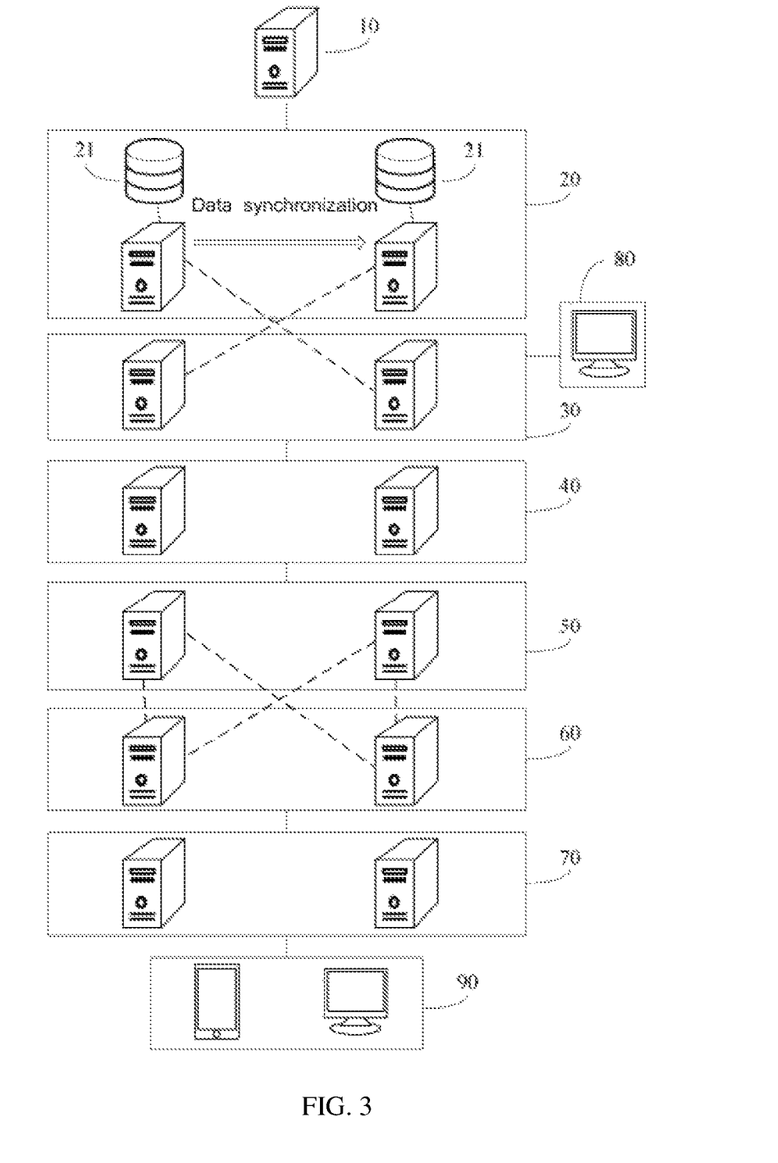
FIG. 3 illustrates a schematic diagram of a server architecture of a network conference platform according to a second embodiment of the present disclosure.

The network conference management methods in the embodiments of the present disclosure can be implemented based on the server architecture of a network conference platform. FIG. 3 illustrates a schematic diagram of the server architecture of a network conference platform. With reference to FIG. 3, the server architecture may include an office automation server group 10, a multi-party conference management server group 20, a hardware access server group 30, a hardware management server group 40, a load balancing server group 50, a software and hardware cascade server group 60, and a participant device access server group 70.

After a user inputs conference reservation information into a conference reservation system, the conference reservation system can upload the conference reservation information to the office automation server group 10. The office automation server group 10 can manage the conference reservation information and transmit the conference reservation information to the multi-party conference management server group 20, so that the multi-party conference management server group 20 can establish a conference. The conference reservation system such as an office automation (OA) system can be configured in the office automation server group 10, so as to implement the automatic management of conference reservation.

The multi-party conference management server group 20 can adopt a master/standby mode, that is, one multi-party conference management server can be used as a master server and the other multi-party conference management server can be used as a standby server, and the real-time synchronization of data can be maintained between the master server and the standby server, so that in the case the master server fails, it can be switched to the standby server to continue the related network conference service, thus avoiding the interruption of the network conference service and ensuring the continuity of the network conference. In a practical application, the main server and the standby server can perform data interaction with the office automation server group 10 through a virtual IP (Internet Protocol) address. A database 21 is established in each multi-party conference management server, which can be used to manage the shared conference accounts. Corresponding to the master/standby mode of the multi-party conference management server group 20, the database in the multi-party conference management server which is used as the master server is a master database, and the database in the multi-party conference management server which is used as the standby server is a standby database. A shared conference account resource pool which is capable of bearing different number of participants is established in the multi-party conference management server group 20. In a practical application, the maximum concurrent number of participating devices corresponding to each shared conference account in the shared conference account resource pool can be set, and the maximum concurrent number is the maximum number of devices that a certain shared conference account can support to log in at the same time. In specific application, the maximum concurrent number corresponding to each shared conference account can also be set as the maximum number of participating devices that can be carried by the server architecture, so as to ensure that as many users as possible can join the network conference within the same time period, which is not specifically limited to the embodiments of the disclosure.

The hardware access server group 30 can configure functions such as registration, access, signaling control, and video coding and conversion of hardware participating devices. In prior to the network conference, the hardware participating devices 80 can access the network conference platform through the hardware access server group 30, so that the hardware participants 80 can join the network conference. In a practical application, the hardware access server group 30 may include at least two hardware access servers. The at least two hardware access servers may perform a load balancing configuration, so that the multi-party conference management server group 20 may allocate related functions of some hardware participating devices to the hardware access server having currently a lighter load, according to the current load situation of each hardware access server. In this way, uneven distributions of server resources and ensure effective utilization of resources can be avoided.

The hardware management server group 40 can be configured to automatically call the hardware participating devices when the conference start time reserved by the user arrives, so that the respective hardware participating devices in the power-on state can automatically enter the network conference, and thus the manual operation of user can be reduced.

The load balancing server group 50 can be configured to automatically allocate the hardware participating devices to the hardware access server that has the lightest load, and automatically allocate the participating devices to the access server that has the lightest load, thereby avoiding uneven distribution of server resources and ensuring effective utilization of resources. In a practical application, the load balancing server group 50 can adopt a dual active mode, that is, two or more load balancing servers can perform load balancing services online at the same time, thus improving the working efficiency.

The software and hardware cascade server group 60 can be configured to cascade the hardware participating devices and cascade the participating devices, so that the actual number of interfaces can be expanded so as to allow more participating devices to access the network conference platform. In a practical application, the software and hardware cascade server group 60 can also adopt the dual active mode, that is, two or more software and hardware cascade servers can provide services online at the same time, thus improving the working efficiency.

The participating device access server group 70 can be configured to access the participating devices to the network conference platform. A user can log in the network conference platform with a participating device such as a smart phone, so that when the conference start time arrives, the participating device access server group 70 can access the participating device to the network conference platform and allow the user join the network conference. In a practical application, the participating device access server group 70 can also adopt the dual active mode, that is, two or more access servers can perform the participating device access services online at the same time, thus improving the working efficiency.

In a specific application, in order to ensure the efficient availability of the network conference platform, and to protect the whole process of reserving a conference, joining a conference, and conducting a conference from being affected, all service groups can adopt the mode of dual computers or hot standby, and respective servers in each server group can synchronize the database in real time. Thus, interruptions of the network conference can be avoided and the continuity of the conference can be ensured.

In a practical application, the network conference is usually between two or more parties. Correspondingly, the conference holding party which plays a leading role in the conference may be the main conference room, and other participating parties can be the branch conference rooms. Therefore, when it is required to conduct a network conference, the person in charge of the conference holding party, or other relevant personnel can reserve a network conference through the conference reservation system. Each user can register an account in the conference reservation system, and then log in his/her account in the conference reservation system when it is necessary to reserve a network conference, so as to fill in the conference reservation information and make a reservation for the conference.

In addition, the network conference system can also include one or more of the following: a camera, a display which is used for displaying power point and other presentations or word/pdf documents, a projector, a microphone, a speaker, a headset, and networking device.

In the embodiment of this disclosure, the aforesaid step may specifically include: receiving main conference room reservation information which at least comprises a conference start time and a first number of main conference room participating devices; receiving a contact account of a branch conference room, when receiving an establish instruction of the branch conference room; transmitting a request for filling branch conference room reservation information to the contact account of the branch conference room; receiving branch conference room reservation information that is input through the contact account of the branch conference room, which at least comprises a second number of branch conference room participating devices; and adding the first number and the second number so as to obtain the total number of the participating devices.

Figure 4:
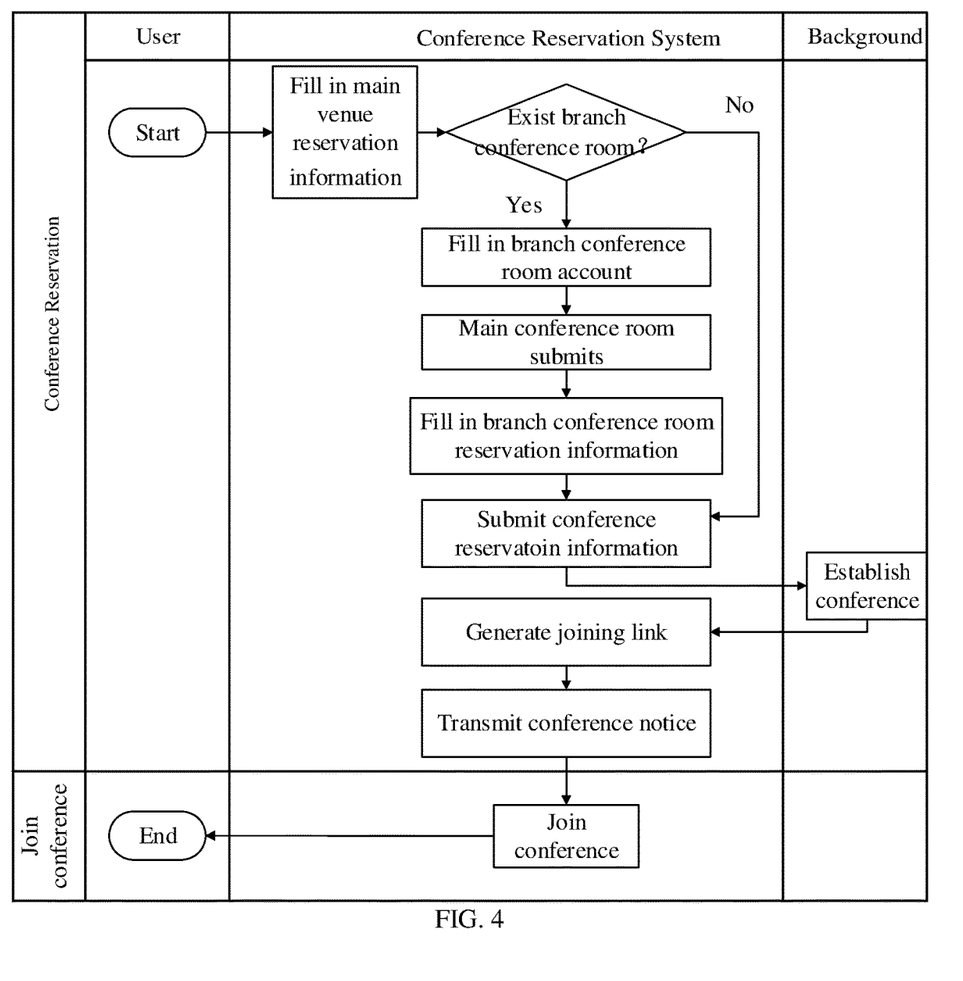
FIG. 4 illustrates a flow chart of a network conference management according to a second embodiment of the present disclosure.

Specifically, FIG. 4 illustrates a flow chart of network conference management. With reference to FIG. 4, based on the server architecture of the above network conference platform, in the network conference management step, a user of a main conference room can log in the conference reservation system with a terminal, such as, a computer, and start the conference reservation process. Firstly, the user of the main conference room can fill in main conference room reservation information which at least includes a conference start time and a first number of main conference room participating devices. When the user finish filling in the main conference room reservation information, the office automation server group 10 may receive the main conference room reservation information. Then, the user of the main conference room can confirm whether there is a branch conference room in the conference reservation system. If not, the user of the main conference room can directly submit the main conference room reservation information as the only conference reservation information. If there is, the user of the main conference room can establish a branch conference room by clicking a branch conference room adding icon so that the conference reservation system may receive an establish instruction of the branch conference room and then display an input box for a contact account of the branch conference room. The user of the main conference room can fill in the contact account of the branch conference room in the input box and submit it. Then, the office automation server group 10 can receive the contact account of the branch conference room, and then automatically allocate a reservation association code which may be in the form of a string, to the branch conference room, and then transmit a request for filling in branch conference room reservation information to the contact account of the branch conference room, which may include the reservation association code, and of course, other related contents such as the time limit for completing the branch conference room reservation information. In prior to filling in the branch conference room reservation information by a user of a branch conference room, it is needed to input the reservation association code, so that the user of the branch conference room can view the main conference room reservation information. When the branch conference room user finishes filling in the branch conference room reservation information, the office automation server group 10 may receive the branch conference room reservation information that is input through the contact account of the branch conference room. The branch conference room reservation information at least includes a second number of branch conference room participating devices. Then, the office automation server group 10 may add the first number and the second number, so as to obtain the total number of the participating devices, that is, to determine how many devices join the conference in all conference rooms.

In a practical application, the main conference room reservation information may also include more detailed conference-related information, such as, at least one of a conference topic, a main conference room location, and main conference room participant information. Similarly, the branch conference room reservation information may also include more detailed conference-related information, such as, at least one of a branch conference room location and branch conference room participant information, which is not limited to the embodiments of the present disclosure.

In addition, in a practical application, there may be one or more branch conference rooms that need to attend the network conference. During the conference reservation process, the branch conference room contact account for each branch conference room may be added, so that the user of each branch conference room can complete their respective branch conference room reservation information according to the reservation association code, which is not limited to the embodiments of the present disclosure.

In a practical application, after the user submits the conference reservation information, the information may be additionally checked by a check person so as to determine whether the conference can be established, which is not specifically limited to the embodiments of the present disclosure.

In step 202: a maximum concurrent number of participating devices that are corresponding to respective shared conference accounts which are remained is determined, from a preset shared conference account resource pool.

In this step, with reference to FIG. 4, the office automation server group 10 can transmit the conference reservation information to the multi-party conference management server group 20, so that the multi-party conference management server group 20 can establish a conference in the background. A shared conference account resource pool that is capable of bearing different number of participants is established in the multi-party conference management server group 20. Accordingly, the multi-party conference management server group 20 can first determine whether there are still unallocated shared conference accounts in the shared conference account resource pool. If there are unallocated shared conference accounts, the multi-party conference management server group 20 can determine the maximum concurrent number of participating devices that are corresponding to each remaining shared conference account so as to allocate a target shared conference account that is capable of bearing the total number of participating terminals of this network conference.

It should be noted that users in each conference room can access the conference through software or hardware participating devices. During the network conference, each participating device can output a single-pass video, and the single-pass video output by each participating device is separately encoded and decoded, so as to be displayed to all participating parties. Each hardware participating device can also output a single-pass video, and in order to reduce the bandwidth occupied by video transmission, the multi-pass video output by the respective hardware participating devices are integrated into a single-pass video for encoding and decoding, and etc. That is, there is only one-pass video to be processed in the case where one hardware participating device accesses the network conference, and there is also one-pass video to be processed in the case where more than one hardware participating devices access the network conference. Therefore, whether one hardware participating device or more hardware participating devices, only one terminal bearing amount of the shared conference account is occupied. Therefore, the bearing capacity that the shared conference account allocated for the network conference needs to have, largely depends on the total number of the participating devices that access the network conference.

In step 203: a target shared conference account which has a maximum concurrent number greater than or equal to the total number of the participating devices is selected for allocation, from the respective shared conference accounts.

The multi-party conference management server group 20 can first determine whether there is a hardware participating device which participates in this conference. If not, the target shared conference account which has a maximum concurrent number greater than or equal to the total number of the participating devices may be selected for allocation, from the respective shared conference accounts remained in the shared conference account resource pool. If so, the target shared conference account which has the maximum concurrent number greater than the total number of the participating devices may be selected for allocation, from the respective shared conference accounts remained in the shared conference account resource pool. That is, regardless of the actual number of hardware participating devices, it can be regarded as that it is needed to add one more participating device for the network conference.

In a practical application, the multi-party conference management server group 20 can also directly assume that there is a hardware participating device to participate in the conference. Correspondingly, in a specific application, the multi-party conference management server group 20 can also select a target shared conference account which has a maximum concurrent number at least larger than the total number of the participating devices by 1, for allocation, which is not specifically limited to the embodiments of this disclosure.

In step 204: the conference reservation information also includes at least one target conference room information, and according to a corresponding relationship between preset conference room information and hardware participating device information, target hardware participating device information that is corresponding to each target conference room information is determined.

In the embodiments of the present disclosure, users in each conference room can access the conference through hardware participating devices. In a practical application, the respective hardware participating devices are usually placed in different conference rooms. Accordingly, the corresponding relationship between each conference room information and each hardware participating device information can be preset in the multi-party conference management server group 20 in advance. Further, in the case where a user needs to join the conference through at least one target hardware participating device respectively placed in at least one target conference room, at least one target conference room information can be filled in the conference reservation system, and then the multi-party conference management server group 20 can determine the target hardware participating device information corresponding to each target conference room information according to the corresponding relationship between the preset conference room information and the hardware participating device information.

In specific applications, the target conference room information may include a conference room number, a conference room name, and etc., which can uniquely identify the target conference room. In addition, the target hardware participating device information may include the IP address of the target hardware participating device, etc., which is not limited to the embodiments of the present disclosure.

So far, the network conference platform is successfully established. With reference to FIG. 4, the conference reservation system can generate a joining link, and then transmit a successful conference reservation notice to the respective participating devices reserved by users, and the successful conference reservation notice can include a joining link, so that the respective participating users can join the conference by triggering the joining link.

In step 205: when the conference start time arrives, the respective target hardware participating devices are booted according to the respective target hardware participating device information.

When the conference start time reserved by the user arrives, in the case where the respective target hardware participating devices are in the power-on state, the hardware management server group 40 can automatically boot the respective target hardware participating devices, by using the device information which can be used to access the respective target hardware participating devices, such as, the IP addresses of the respective target hardware participating devices.

In the embodiments of the present disclosure, the target hardware participating device information that is corresponding to each target conference room information can be determined according to the corresponding relationship between the preset conference room information and the hardware participating device information. That is, the corresponding hardware participating devices can be directly booted according to the reserved conference room information, so that there is no need to reserve a conference room after the hardware participating device is reserved, and the efficiency of conference reservation can be improved.

In step 206: the respective participating devices are accessed.

After the hardware management server group 40 boots the respective target hardware participating devices, the respective target hardware participating devices can automatically access to the network conference platform, thus reducing user's operations.

In step 207: when the conference start time arrives, the respective participating devices which have logged in the target shared conference account get access to the platform.

When the conference start time reserved by the user arrives, each user can log in the target shared conference account with the their respective participating devices, and then the conference reservation system may remind the users to trigger a joining link as soon as possible, so that after the respective users trigger the joining link, the multi-party conference management server group 20 can access the respective participating devices which have logged in the target shared conference account to the network conference platform.

In step 208: a target conference resource that is corresponding to the target shared conference account is invoked so as to conduct a network conference.

After the respective hardware participating devices and the respective participating devices get access to the network conference platform, the network conference platform can invoke the target conference resource such as a media resource, a server resource, a codec resource, and etc., which is corresponding to the target shared conference account, so as to conduct a network conference, thereby implementing the real-time communication between the main conference room and the respective branch conference rooms.

In step 209: when the network conference ends, the target shared conference account and the target conference resource are released.

After the communication between the respective conference rooms is finished, users from the respective conference rooms can exit the network conference by clicking a conference exit icon or the like. The network conference ends when all users exit the network conference. The network conference platform can release the target shared conference account and the target conference resource, so that the target shared conference account can be released into a shared conference account resource pool, and then the target shared conference account can be used again when other users make conference reservations.

In the embodiments of the present disclosure, the network conference platform may first acquire conference reservation information which at least comprises a conference start time and a total number of participating devices; then allocate a target shared conference account according to the total number of the participating devices; and then allow respective participating devices which have logged in the target shared conference account to access, when the conference start time arrives; further, invoke a target conference resource that is corresponding to the target shared conference account so as to conduct a network conference; and release the target shared conference account and the target conference resource, when the network conference ends. In the embodiments of the present disclosure, the shared conference accounts can be allocated according to the needs of participating devices when it needs to be used, and then recycled after the conference ends. In this way, the actual number of conference accounts that need to be managed is reduced, thus the difficulty of conference account management can be reduced. In addition, because the shared conference accounts can be allocated according to needs, it can avoid the phenomenon that only higher-level employees are allocated conference accounts in order to reduce the difficulty and cost of conference account management, so that every employee in an enterprise can reserve and conduct a network conference through the shared conference accounts. In this way, the usage authority of conference accounts can be expanded, and the office efficiency can be improved.

Embodiment 3

Figure 5:
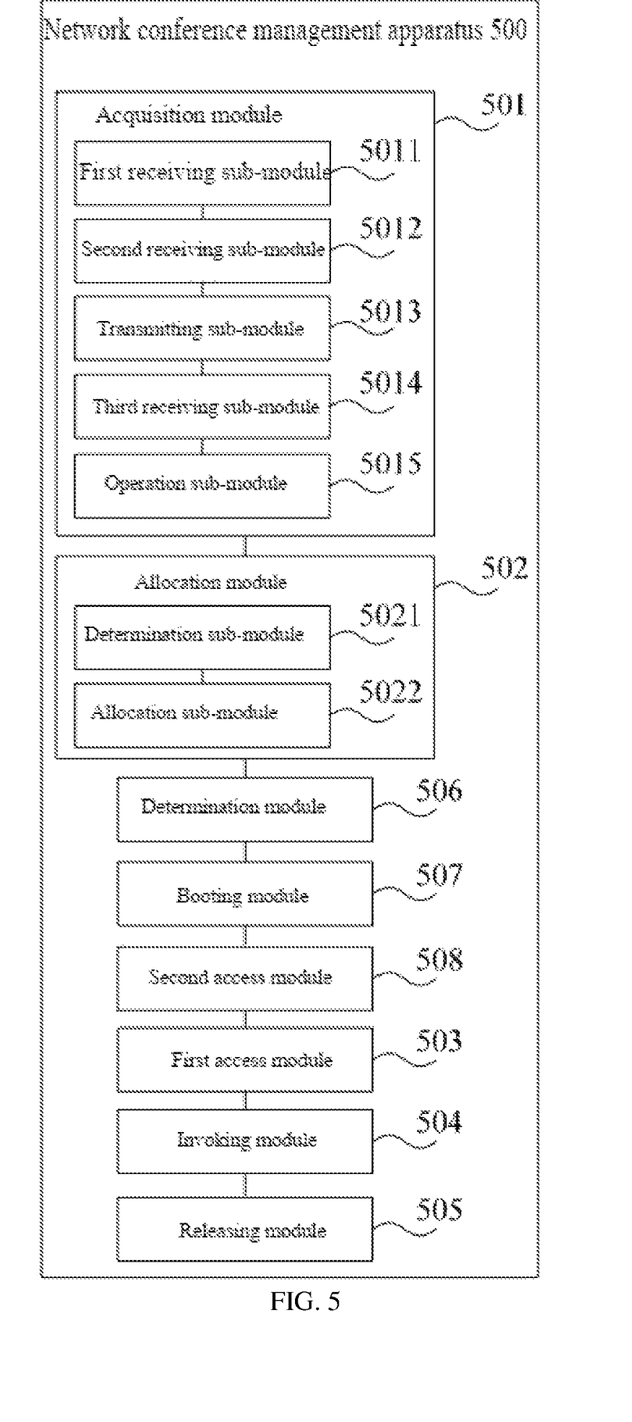
FIG. 5 illustrates a schematic structural diagram of a network conference management apparatus according to a third embodiment of the present disclosure.

FIG. 5 illustrates a schematic structural diagram of a network conference management apparatus according to the embodiment 3 of the present disclosure. With reference to FIG. 5, the network conference management apparatus 500 may include an acquisition module 501, an allocation module 502, a first access module 503, an invoking module 504, and a releasing module 505.

The acquisition module 501 is configured to acquire conference reservation information, and the conference reservation information at least comprises a conference start time and a total number of participating devices.

The allocation module 502 is configured to allocate a target shared conference account, according to the total number of the participating devices.

The first access module 503 is configured to get respective participating devices which have logged in the target shared conference account to access the platform, when the conference start time arrives.

The invoking module 504 is configured to invoke a target conference resource that is corresponding to the target shared conference account so as to conduct a network conference.

The releasing module 505 is configured to release the target shared conference account and the target conference resource, when the network conference ends.

Optionally, with reference to FIG. 5, the conference reservation information also includes at least one target conference room information, and the apparatus 500 further includes a determination module 506.

The determination module 506 is configured to determine target hardware participating device information that is corresponding to each target conference room information, according to a corresponding relationship between preset conference room information and hardware participating device information.

The apparatus 500 further comprises: a booting module 507 and a second access module 508.

The booting module 507 is configured to boot the respective target hardware participating devices according to respective target hardware participating device information when the conference start time arrives.

The second access module 508 is configured to get the respective target hardware participating devices access to the platform.

The target hardware participating device information includes the IP address of the target hardware participating device.

Optionally, with reference to FIG. 5, the allocation module 502 includes: a determination sub-module 5021, and an allocation sub-module 5022.

The determination sub-module 5021 is configured to determine a maximum concurrent number of participating devices that are corresponding to respective shared conference accounts which are remained, from a preset shared conference account resource pool.

The allocation sub-module 5022 is configured to select, from the respective shared conference accounts, a target shared conference account which has a maximum concurrent number greater than or equal to the total number of the participating devices for allocation.

Optionally, with reference to FIG. 5, the acquisition module 501 comprises: a first receiving sub-module 5011, a second receiving sub-module 5012, a transmitting sub-module 5013, a third receiving sub-module 5014, and an operation sub-module 5015.

The first receiving sub-module 5011 is configured to receive main conference room reservation information, which at least comprises a conference start time and a first number of main conference room participating devices.

The second receiving sub-module 5012 is configured to receive a branch conference room contact account, upon receiving an establish instruction of a branch conference room.

The transmitting sub-module 5013 is configured to transmit a request for filling in branch conference room reservation information to the branch conference room contact account.

The third receiving sub-module 5014 is configured to receive branch conference room reservation information that is input with the branch conference room contact account. The branch conference room reservation information at least comprises a second number of branch conference room participating devices.

The operation sub-module 5015 is configured to add the first number and the second number so as to obtain the total number of the participating devices.

Optionally, the main conference room reservation information also includes at least one of a conference topic, a conference end time, a main conference room location, and main conference room participant information. The conference room reservation information also includes at least one of a branch conference room location and branch conference room participant information.

In the embodiments of the present disclosure, the network conference platform may first acquire conference reservation information with the acquisition module. The conference reservation information at least comprises a conference start time and a total number of participating devices. Then, the allocation module allocates a target shared conference account according to the total number of the participating devices. Then, the first access module gets respective participating devices which have logged in the target shared conference account access to the platform, when the conference start time arrives. Next, the invoking module invokes a target conference resource that is corresponding to the target shared conference account so as to conduct a network conference. The releasing module releases the target shared conference account and the target conference resource, when the network conference ends. In the embodiments of the present disclosure, the shared conference accounts can be allocated according to the needs of participating devices when it needs to be used, and then recycled after the conference ends. In this way, the actual number of conference accounts that need to be managed is reduced, and thus the difficulty of conference account management can be reduced.

For the sake of clarity, all the aforementioned method embodiments are expressed as a series of action combinations, but those skilled in the art should know that this disclosure is not limited to the described action sequence, because according to this disclosure, some steps can be performed in other sequences or simultaneously. Secondly, those skilled in the art should also know that the embodiments described in the specification are exemplary preferred embodiments, and the actions and modules involved are not necessary for this disclosure.

All the embodiments in this specification are described in a progressive way, and the description of each embodiment are focused on the differences from other embodiments. The same and similar parts among the embodiments can be referred to each other.

Finally, it should be noted that in this disclosure, relational terms such as first and second are only used to distinguish one entity or operation from another entity or operation, and do not necessarily require or imply any such actual relationship or order between these entities or operations. Furthermore, the terms "including", "including" or any other variant thereof are intended to cover non-exclusive inclusion, so that a process, method, commodity or device including a series of elements includes not only those elements, but also other elements not explicitly listed, or elements inherent to such process, method, commodity or device. Without further restrictions, the elements defined by the sentence "including one . . . " do not exclude the existence of other identical elements in the process, method, commodity or device including the elements.

The network conference management method and apparatus provided by the present disclosure are described in details as above. In this disclosure, specific examples are provided to illustrate the principles and implementations of the present disclosure. The explanations of the above embodiments are only used to facilitate understanding the methods and main principle of the present disclosure. At the same time, according to the main principle of this disclosure, those skilled in the art can make any changes to the specific implementation ways and application scopes. To sum up, the contents of this specification should not be construed as a limitation of this disclosure.

What is claimed is:

1. A network conference management method, comprising:
   acquiring conference reservation information, wherein the conference reservation information at least comprises a conference start time and a total number of participating devices;
   allocating automatically a target shared conference account and a corresponding resource, according to the total number of the participating devices; and
   accessing automatically a participating device which has logged in the target shared conference account, at the conference start time,
   wherein the allocating the target shared conference account according to the total number of the participating devices, comprises:
      determining a maximum concurrent number of the participating devices that are corresponding to respective shared conference accounts which are remained, from a preset shared conference account resource pool; and
      selecting, from the respective shared conference accounts, the target shared conference account which has the maximum concurrent number greater than or equal to the total number of the participating devices for allocation, and
   wherein the maximum concurrent number is an upper limit of the number of the participating devices that each of the respective shared conference accounts can support logging in at the same time.

2. The method according to claim 1, further comprising:
invoking a resource that is corresponding to the target shared conference account so as to conduct a network conference; and
releasing the target shared conference account and the corresponding resource, when the network conference ends.

3. The method according to claim 1, wherein the conference reservation information further comprises at least one conference room information; and in prior to accessing automatically the participating device which has logged in the target shared conference account at the conference start time, the method further comprises:
determining participating device information that is corresponding to each of the at least one conference room information, according to a preset corresponding relationship between the conference room information and the participating device information; and
accessing automatically the participating device which has logged in the target shared conference account, at the conference start time, further comprises:
booting automatically the participating device, according to the participating device information; and
accessing automatically the participating device,
wherein the participating device information comprises an IP address of the participating device.

4. The method according to claim 1, wherein acquiring the conference reservation information comprises:
receiving main conference room reservation information, wherein the main conference room reservation information at least comprises the conference start time and a first number of main conference room participating devices;
receiving a contact account of a branch conference room, when receiving an establish instruction of the branch conference room;
transmitting a request for filling in branch conference room reservation information to the contact account of the branch conference room;
receiving the branch conference room reservation information that is associated with the contact account of the branch conference room, wherein the branch conference room reservation information at least comprises a second number of branch conference room participating devices; and
adding the first number and the second number so as to obtain the total number of the participating devices.

5. The method according to claim 4, wherein the main conference room reservation information further comprises at least one of a conference topic, a conference end time, a main conference room location, and main conference room participant information, and the branch conference room reservation information further comprises at least one of a branch conference room location and branch conference room participant information.

6. A non-transitory computer-readable storage medium, wherein the non-transitory computer-readable storage medium is stored with a computer program, and when the computer program is executed by a processor, the network conference management method according to claim 1 is implemented.

7. A network conference management apparatus, comprising:
an acquisition module, configured to acquire conference reservation information, wherein the conference reservation information at least comprises a conference start time and a total number of participating devices;
an allocation module, configured to allocate a target shared conference account, according to the total number of the participating devices; and
a first access module, configured to access a participating device which has logged in the target shared conference account at the conference start time;
wherein the allocation module comprises:
a determination sub-module, configured to determine a maximum concurrent number of the participating devices that are corresponding to respective shared conference accounts which are remained, from a preset shared conference account resource pool; and
an allocation sub-module, configured to select, from the respective shared conference accounts, the target shared conference account which has the maximum concurrent number greater than or equal to the total number of the participating devices for allocation,
wherein the maximum concurrent number is an upper limit of the number of the participating devices that each of the respective shared conference accounts can support logging in at the same time.

8. The network conference management apparatus according to claim 7, further comprising:
an invoking module, configured to invoke a target conference resource that is corresponding to the target shared conference account so as to conduct a network conference; and
a releasing module, configured to release the target shared conference account and the target conference resource, when the network conference ends.

9. The network conference management apparatus according to claim 7, wherein the conference reservation information further comprises at least one conference room information, and the apparatus further comprises:
a determination module, configured to determine participating device information that is corresponding to each of the at least one conference room information, according to a preset corresponding relationship between the conference room information and the participating device information, in prior to accessing respective participating devices by the first access module;
a booting module, configured to boot the participating device according to respective participating device information at the conference start time; and
a second access module, configured to access the participating device,
wherein the participating device information comprises an IP address of the participating device.

10. The network conference management apparatus according to claim 7, wherein the acquisition module comprises:
a first receiving sub-module, configured to receive main conference room reservation information, wherein the main conference room reservation information at least comprises the conference start time and a first number of main conference room participating devices;
a second receiving sub-module, configured to receive a contact account of a branch conference room, when receiving an establish instruction of the branch conference room;
a transmitting sub-module, configured to transmit a request for filling branch conference room reservation information to the contact account of the branch conference room;

a third receiving sub-module, configured to receive the branch conference room reservation information that is input through the contact account of the branch conference room, wherein the branch conference room reservation information at least comprises a second number of branch conference room participating devices; and an operation sub-module, configured to add the first number and the second number so as to obtain the total number of the participating devices.

11. A network conference platform, comprising:

an office automation server group, configured to acquire conference reservation information, wherein the conference reservation information at least comprises a conference start time and a total number of participating devices;

a multi-party conference management server group, configured to receive the conference reservation information from the office automation server group, and allocate a target shared conference account, according to the total number of the participating devices; and a participating device access server group, configured to access a participating device which has logged in the target shared conference account to the network conference platform at the conference start time, wherein the multi-party conference management server group is further configured to determine a maximum concurrent number of the participating devices that are corresponding to respective shared conference accounts which are remained, from a preset shared conference account resource pool, and configured to select, from the respective shared conference accounts, the target shared conference account which has the maximum concurrent number greater than or equal to the total number of the participating devices for allocation, and wherein the maximum concurrent number is an upper limit of the number of the participating devices that each of the respective shared conference accounts can support logging in at the same time.

12. The network conference platform according to claim 11, wherein the multi-party conference management server group is further configured to invoke a target conference resource that is corresponding to the target shared conference account so as to conduct a network conference, and release the target shared conference account and the target conference resource when the network conference ends.

13. The network conference platform according to claim 11, wherein, the participating device access server group is also configured to automatically call the participating devices at the conference start time, so that a participating device which is in a power-on state automatically enters a network conference; and the network conference platform further comprises:

a load balancing server group, configured to automatically allocate the participating devices to a hardware access server that has a lightest load; and a cascade server group, configured to cascade the participating devices.

14. The network conference platform according to claim 11, wherein the multi-party conference management server group comprises a master server and at least one standby server, the master server keeps real-time synchronization of data with the at least one standby server, and switches to one of the at least one standby server in a case where the master server fails.

15. The network conference platform according to claim 14, wherein the master server and the at least one standby server perform data interaction with the office automation server group by using a virtual IP address.

16. The network conference platform according to claim 11, wherein the participating device access server group comprises two or more access servers that simultaneously provide online participating device access services.

17. A network conference system, comprising the network conference platform according to claim 11, further comprising one or more of a camera, a display for displaying power point or word documents or pdf documents, a projector, a microphone, a speaker, a headset, and a networking device.

18. The network conference system according to claim 17, wherein, the network conference platform is configured to automatically call participating devices at a conference start time, so that the participating device which is in a power-on state automatically enters a network conference; and the network conference platform further comprises:

a load balancing server group, configured to automatically allocate the participating devices to a hardware access server that has a lightest load; and a cascade server group, configured to cascade the participating devices.

* * * * *